(12) United States Patent
Uhm et al.

(10) Patent No.: US 10,964,924 B2
(45) Date of Patent: Mar. 30, 2021

(54) PACKAGING FOR FLEXIBLE SECONDARY BATTERY AND FLEXIBLE SECONDARY BATTERY COMPRISING THE SAME

(71) Applicant: LG Chem, Ltd., Seoul (KR)

(72) Inventors: In-Sung Uhm, Daejeon (KR); Ju-Ryoun Kim, Daejeon (KR); Yong-Hee Lee, Daejeon (KR); Sang-Hun Kim, Daejeon (KR); Jae-Hyun Lee, Daejeon (KR); Yong-Su Choi, Daejeon (KR); Soo-Ji Hwang, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/753,024

(22) PCT Filed: Mar. 29, 2019

(86) PCT No.: PCT/KR2019/003745
§ 371 (c)(1),
(2) Date: Apr. 2, 2020

(87) PCT Pub. No.: WO2019/190285
PCT Pub. Date: Oct. 3, 2019

(65) Prior Publication Data
US 2020/0259132 A1    Aug. 13, 2020

(30) Foreign Application Priority Data
Mar. 30, 2018    (KR) .......... 10-2018-0037437

(51) Int. Cl.
B32B 27/28    (2006.01)
B32B 27/32    (2006.01)
H01M 2/02    (2006.01)

(52) U.S. Cl.
CPC ......... *H01M 2/0275* (2013.01); *B32B 27/281* (2013.01); *B32B 27/285* (2013.01); *B32B 27/32* (2013.01)

(58) Field of Classification Search
CPC .. H01M 2/0275; B32B 27/281; B32B 27/285; B32B 27/32
See application file for complete search history.

(56) References Cited

U.S. PATENT DOCUMENTS

| 4,248,944 A | 2/1981 | Smilanich |
| 5,561,004 A | 10/1996 | Bates et al. |

(Continued)

FOREIGN PATENT DOCUMENTS

| JP | 2005183051 A | 7/2005 |
| JP | 2017168355 A | 9/2017 |

(Continued)

OTHER PUBLICATIONS

International Search Report from Application No. PCT/KR2019/003745 dated Jul. 18, 2019, 2 pages.

(Continued)

*Primary Examiner* — Michael C Miggins
(74) *Attorney, Agent, or Firm* — Lerner, David, Littenberg, Krumholz & Mentlik, LLP

(57) ABSTRACT

Provided is a packaging for a flexible secondary battery, including: a first polymer resin layer; a barrier layer formed on the first polymer resin layer for interrupting moisture and gases; a parylene layer including parylene on at least one surface of the barrier layer; and a second polymer resin layer formed on the barrier layer, wherein the parylene layer has a thickness of 0.1-2.5 μm. A flexible secondary battery including the packaging is also provided.

13 Claims, 6 Drawing Sheets

(56) References Cited

U.S. PATENT DOCUMENTS

| | | | |
|---|---|---|---|
| 2011/0086260 A1 | 4/2011 | Kohlberger et al. |
| 2011/0200871 A1 | 8/2011 | Pytlik et al. |
| 2014/0255765 A1 | 9/2014 | Akita et al. |
| 2014/0335403 A1 | 11/2014 | Akita et al. |
| 2015/0287941 A1 | 10/2015 | Kim et al. |
| 2017/0025645 A1 | 1/2017 | Kwon et al. |
| 2019/0006623 A1 | 1/2019 | Inoue |

FOREIGN PATENT DOCUMENTS

| | | |
|---|---|---|
| KR | 20110009097 A | 1/2011 |
| KR | 20110018338 A | 2/2011 |
| KR | 20140070491 A | 6/2014 |
| KR | 20150062491 A | 6/2015 |
| KR | 20150145442 A | 12/2015 |
| WO | 2017111138 A1 | 6/2017 |

OTHER PUBLICATIONS

Extended European Search Report including Written Opinion for EP19777314.6 dated Nov. 18, 2020; 8 pages.

100

10

100

PACKAGING FOR FLEXIBLE SECONDARY BATTERY AND FLEXIBLE SECONDARY BATTERY COMPRISING THE SAME

CROSS-REFERENCE TO RELATED APPLICATIONS

The present application is a national phase entry under 35 U.S.C. § 371 of International Application No. PCT/KR2019/003745, filed Mar. 29, 2019, published in Korean, which claims priority to Korean Patent Application No. 10-2018-0037437 filed on Mar. 30, 2018 in the Republic of Korea, the disclosures of which including the specification and drawings are incorporated herein by reference.

TECHNICAL FIELD

The present disclosure relates to a packaging for a flexible secondary battery, and a flexible secondary battery comprising the same. More particularly, the present disclosure relates to a packaging for a flexible secondary battery which can prevent cracking caused by tensile stress and compression stress generated under repeated bending environment, and a flexible secondary battery comprising the same.

BACKGROUND ART

As technological development and demand for mobile instruments have been increased, secondary batteries have been increasingly in demand as energy sources. Among such secondary batteries, lithium secondary batteries having high energy density and discharge voltage have been studied intensively and commercialized and used widely.

Secondary batteries are classified broadly into cylindrical batteries, prismatic batteries and pouch-type batteries, depending on the shape of a battery casing in which an electrode assembly of positive electrode/separator/negative electrode is received. As devices tend to be downsized, demand of prismatic batteries and pouch-type batteries has been increased significantly.

In general, a prismatic battery is manufactured by introducing a jelly-roll type or stacked electrode assembly of positive electrode/separator/negative electrode to a prismatic battery casing made of a metallic material, covering the opened top with a top cap, injecting an electrolyte thereto through an electrolyte inlet provided on the top cap, and carrying out sealing.

In addition, a pouch-type battery is manufactured to have a structure obtained by introducing an electrode assembly to a pouch casing made of a laminate sheet and sealing the outer circumference thereof through hot fusion.

Meanwhile, as the devices using such batteries have been diversified, batteries have also been manufactured to have various shapes other than a cuboid shape.

For example, in the case of a smart phone, its lateral shape may be curved to improve a feel of grip. When using a flexible display, it may be bent or curved. Thus, continuous studies have been conducted about curved batteries or batteries having a flexible structure.

It is required for a packaging configured to protect such a flexible battery to have flexibility and moisture-interrupting property at the same time. When using a tube packaging made of a conventional polymer material, moisture or air may infiltrate to the packaging through the micropores of the polymer to cause contamination of the electrolyte present in the battery, resulting in degradation of battery performance.

To overcome the above-mentioned problem, a packaging formed of a metal foil layer may be used. However, due to the stiffness of the metal foil layer itself, a battery is not bent completely when bending the battery, but the surface of the metal foil layer is broken or shows wrinkles. As a result, some problems, such as tearing of the metal foil layer, may occur.

DISCLOSURE

Technical Problem

The present disclosure is directed to providing a packaging for a flexible secondary battery which allows stable operation without any failure of packaging and prevents cracking caused by tensile stress and compression stress even under repeated bending environment, and a flexible secondary battery comprising the same.

Technical Solution

In one aspect of the present disclosure, there is provided a packaging for a flexible secondary battery as defined in any one of the following embodiments.

According to the first embodiment, there is provided a packaging for a flexible secondary battery, including: a first polymer resin layer; a barrier layer formed on the first polymer resin layer for interrupting moisture and gases; a parylene layer including parylene on at least one surface of the barrier layer; and a second polymer resin layer formed on the barrier layer, wherein the parylene layer has a thickness of 0.1-2.5 μm.

According to the second embodiment, there is provided the packaging for a flexible secondary battery as defined in the first embodiment, wherein the parylene is parylene-C.

According to the third embodiment, there is provided the packaging for a flexible secondary battery as defined in the first or the second embodiment, wherein the first polymer resin layer includes any one selected from the group consisting of polyolefin resin, polyester resin, polyamide resin, polyethyleneimine resin, polyether resin, cyanoacrylate resin, organotitanium-based resin, polyurethane resin, polyetherurethane resin, epoxy resin, imide resin, isocyanate resin and silicone resin, or a mixture of two or more thereof.

According to the fourth embodiment, there is provided the packaging for a flexible secondary battery as defined in any one of the first to the third embodiments, wherein the barrier layer includes a metal foil layer, an inorganic layer or a composite of polymer with metal particles.

According to the fifth embodiment, there is provided the packaging for a flexible secondary battery as defined in the fourth embodiment, wherein the barrier layer includes a metal foil layer, and the metal foil layer includes any one selected from the group consisting of iron, carbon, chromium, manganese, nickel, copper, silver, gold and aluminum, or an alloy of two or more thereof.

According to the sixth embodiment, there is provided the packaging for a flexible secondary battery as defined in any one of the first to the fifth embodiments, wherein the second polymer resin layer includes any one selected from the group consisting of polyolefin resin, polyester resin, polyamide resin, polyethyleneimine resin, polyether resin, cyanoacrylate resin, organotitanium-based resin, polyurethane resin, polyetherurethane resin, epoxy resin, imide resin, isocyanate resin and silicone resin, or a mixture of two or more thereof.

According to the seventh embodiment, there is provided the packaging for a flexible secondary battery as defined in any one of the first to the sixth embodiments, wherein the thickness of the parylene layer is 2-2.5 μm.

According to the eighth embodiment, there is provided the packaging for a flexible secondary battery as defined in any one of the first to the seventh embodiments, further including an adhesive layer formed on at least one of a surface on which the barrier layer is in contact with the first polymer resin layer, and a surface on which the barrier layer is in contact with the second polymer resin layer.

According to the ninth embodiment, there is provided the packaging for a flexible secondary battery as defined in any one of the first to the eighth embodiments, which shows a change in water vapor transmission rate of 1-15% before and after repeating a 5R bending test 100 times, and the change in water vapor transmission rate is calculated by the formula of 'Change in water vapor transmission rate (%)=[(Water vapor transmission rate after bending—Water vapor transmission rate before bending)/(Water vapor transmission rate before bending)]×100'.

In another aspect of the present disclosure, there is also provided a flexible secondary battery as defined in the following embodiment.

According to the tenth embodiment, there is provided a flexible secondary battery which includes a flexible electrode assembly and a packaging for receiving the flexible electrode assembly, wherein the packaging is the packaging for a flexible secondary battery as defined in any one of the first to the ninth embodiments.

Advantageous Effects

According to an embodiment of the present disclosure, the packaging for a flexible secondary battery includes a barrier layer interrupting moisture and gases, and thus can prevent contamination of the electrolyte present in the flexible secondary battery to prevent degradation of battery performance and can maintain mechanical strength of the flexible secondary battery.

In addition, the packaging for a flexible secondary battery further includes a parylene layer capable of reinforcing mechanical rigidity and flexibility of the barrier layer, and thus can further reinforce the effect of preventing moisture permeation and flexibility of the flexible secondary battery.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
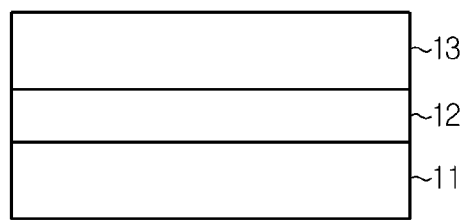
FIG. 1 is a schematic sectional view illustrating the packaging for a flexible secondary battery according to an embodiment of the related art.
Figure 2:
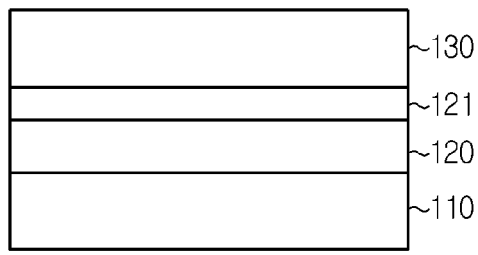
FIG. 2 is a schematic sectional view illustrating the packaging for a flexible secondary battery according to an embodiment of the present disclosure.
Figure 3:
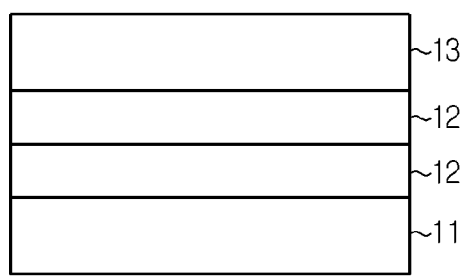
FIG. 3 is a schematic sectional view illustrating the packaging for a flexible secondary battery according to another embodiment of the related art.
Figure 4:
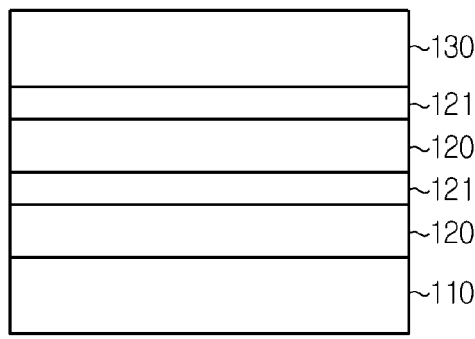
FIG. 4 is a schematic sectional view illustrating the packaging for a flexible secondary battery according to another embodiment of the present disclosure.
Figure 5:
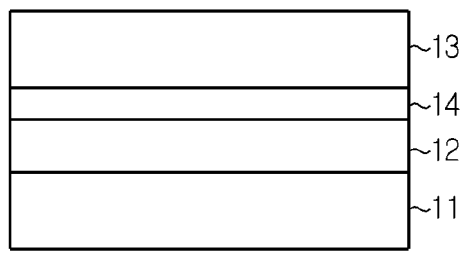
FIG. 5 is a schematic sectional view illustrating the packaging for a flexible secondary battery according to still another embodiment of the related art.
Figure 6:
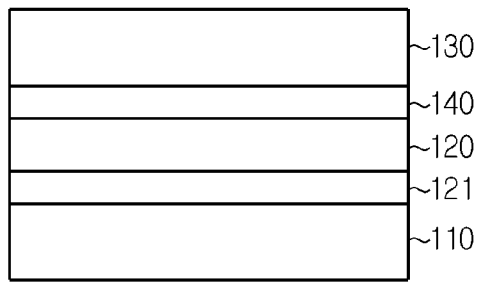
FIG. 6 is a schematic sectional view illustrating the packaging for a flexible secondary battery according to still another embodiment of the present disclosure.

FIGS. 1, 3 and 5 are schematic sectional views each illustrating the packaging for a secondary battery according to the related art, and FIGS. 2, 4 and 6 are schematic sectional views each illustrating the packaging for a secondary battery according to an embodiment of the present disclosure.

Referring to FIGS. 1, 3 and 5, the packaging for a flexible secondary battery according to the related art includes: a first polymer resin layer 11; a barrier layer 12 formed on the first polymer resin layer 11 and interrupting moisture and gases; and a second polymer resin layer 13 formed on the barrier layer 12, wherein the barrier layer 12 may be optionally formed by two layers, or an adhesive layer 14 may be further interposed between the barrier layer 12 and the second polymer resin layer 13.

Referring to FIGS. 2, 4 and 6, the packaging 100 for a flexible secondary battery according to an embodiment of the present disclosure includes: a first polymer resin layer 110; a barrier layer 120 formed on the first polymer resin layer 110 and interrupting moisture and gases; and a second polymer resin layer 130 formed on the barrier layer 120, the packaging further including a parylene layer 121 including parylene on at least one surface of the barrier layer 120. In addition, the packaging for a flexible secondary battery may further include an adhesive layer 140 between the barrier layer 120 and the second polymer resin layer 130.

Hereinafter, each layer will be explained in more detail.

The packaging 100 for a flexible secondary battery according to the present disclosure includes a barrier layer interrupting moisture and gases. Thus, the packaging for a flexible secondary battery can prevent contamination of the electrolyte present in the flexible secondary battery and degradation of battery performance, and can maintain mechanical strength of the flexible secondary battery.

In addition, the packaging for a flexible secondary battery further includes a parylene layer 121 capable of reinforcing mechanical rigidity and flexibility of the barrier layer 120, and thus can further reinforce the effect of preventing moisture permeation and flexibility of the flexible secondary battery.

According to the related art, as a protective layer for preventing cracking in the barrier layer, a material, such as polyethylene terephthalate (PET) or nylon, was attached to one surface of the barrier layer. However, it was difficult to prevent cracking caused by stress in a repeated bending situation. Moreover, it was problematic that battery performance was degraded due to the moisture permeation caused thereby. However, according to the present disclosure, a parylene layer 121 is further provided on at least one surface of the barrier layer 120 so that the above-mentioned problems may be overcome.

Herein, the parylene layer 121 may have a thickness of 0.1-2.5 μm, particularly 0.1-2 μm, 0.5-2 μm, or 2-2.5 μm. When the thickness is larger than the above-defined range, crystallinity is increased and brittleness is also increased undesirably in terms of physical properties of parylene. When the thickness is smaller than the above-defined range, it is not possible to accomplish the object of forming the parylene layer.

In addition, parylene forming the parylene layer 121 may include parylene-N, parylene-C, parylene-D, parylene-HT, or the like. Among them, parylene-C having the lowest gas permeability is most preferred.

Herein, the parylene layer may be formed through a vapor deposition process by using a monomer, such as p-xylene, which can be polymerized into parylene, as a material to be polymerized. Particularly, the parylene layer may be formed by the method including the steps of: vaporizing parylene dimer (p-xylene, or the like) powder to form gaseous parylene dimers; pyrolyzing the gaseous parylene dimers to produce parylene monomers; and supplying the parylene monomers to a vapor deposition chamber so that it may be deposited on an object to be coated in the state of polymer, thereby forming a parylene layer as a parylene polymer film.

According to an embodiment of the present disclosure, in the vaporizing step, parylene dimer powder may be heated to a temperature of 105° C. or higher, or a temperature of about 150° C. under vacuum of $10^{-3}$ to 1 torr so that parylene dimers may sublimate into a gaseous state while not being molten. Then, in the pyrolyzing step, the parylene dimers introduced by the vaporizing step are pyrolyzed to produce parylene monomers (highly reactive p-xylene radicals, etc., as intermediate products). Particularly, for the purpose of pyrolyzing reaction capable of providing a high yield of parylene monomers, the parylene dimers may be heated to about 650° C. or higher. In the deposition step, the parylene monomers introduced by the pyrolyzing step are deposited on an object to be coated at room temperature under vacuum (e.g. 0.1-2 torr) to form a parylene layer as a parylene polymer film.

According to the present disclosure, the first polymer resin layer 110 functions as a layer that can be adhered with the electrode assembly received in the packaging. The first polymer resin layer may include any one selected from the group consisting of polyolefin resin, polyester resin, polyamide resin, polyethyleneimine resin, polyether resin, cyanoacrylate resin, organotitanium-based resin, polyurethane resin, polyetherurethane resin, epoxy resin, imide resin, isocyanate resin and silicone resin, or a mixture of two or more of them. Preferably, cast polypropylene (CPP) may be used.

Herein, the first polymer resin layer 110 may also function as a heat shrinking tube layer. A heat shrinking tube is a tube that is shrunk upon heating, wraps a terminal or a material having a different shape or size closely with no gaps, is generally made of a polymer resin, and is used for insulation or other applications. As the heat shrinking tube, any heat shrinking tube suitable for the object of the present disclosure may be easily obtained and used from commercially available heat shrinking tubes having various materials and shapes. Herein, it is required to set the temperature during a shrinking process at low temperature so that the secondary battery may not be thermally damaged. In generally, it is required to finish shrinking at a temperature of 70-200° C. or 70-120° C.

In addition, the first polymer resin layer 110 preferably has a thickness of about 15-500 μm. With reference to the thickness of the first polymer resin layer 110, the minimum thickness should be 15 μm or more in order to maintain adhesive strength as a sealing material. Preferably, the thickness of the first polymer resin layer is 500 μm or less, considering the capacity per volume of a battery.

Meanwhile, the barrier layer 120 may be a layer including a metal foil layer, an inorganic layer or a composite of polymer with metal particles.

Herein, the metal foil layer may include any one selected from the group consisting of iron, carbon, chromium, manganese, nickel, copper, silver, gold and aluminum, or an alloy of two or more of them.

In addition, the inorganic layer is a layer including inorganic particles, such as $SiO_2$, $Al_2O_3$, MgO, $BaTiO_3$, $ZrO_2$ and ZnO, and the inorganic particles may have an average particle diameter of 1 nm to 5 μm. Since the barrier layer includes the inorganic particles, it is possible to further improve an insulation effect in the battery. It is also possible to inhibit moisture permeation into the battery and to minimize contamination of electrolyte ingredients in the battery, thereby preventing degradation of battery performance.

In addition, in the composite of polymer with metal particles, the polymer may be formed of any one selected from the group consisting of high-density polyethylene, low-density polyethylene, linear low-density polyethylene, ultrahigh-molecular weight polyethylene, polypropylene, polyethylene terephthalate, polybutylene terephthalate, polyester, polyacetal, polyamide, polycarbonate, polyimide, polyetherether ketone, polyether sulfone, polyphenylene oxide, polyphenylene sulfide and polyethylene naphthalate, or a mixture of two or more of them. Further, the metal particles may be any one selected from the group consisting of iron, carbon, chromium, manganese, nickel, copper, silver, gold and aluminum, or an alloy of two or more of them.

The barrier layer 120 may have a thickness of 1-30 μm, preferably 3-20 μm. Within the above-defined range, the barrier layer can interrupt moisture while preventing cracking caused by external stimulation.

In addition, the barrier layer 120 may be formed as a single layer, or two or more layers, between the first polymer resin layer 110 and the second polymer resin layer 130.

Meanwhile, the second polymer resin layer 130 is made of a material capable of preventing cracking of the barrier layer 120. The second polymer resin layer may include any one selected from the group consisting of polyolefin resin, polyester resin, polyamide resin, polyethyleneimine resin, polyether resin, cyanoacrylate resin, organotitanium-based resin, polyurethane resin, polyetherurethane resin, epoxy resin, imide resin, isocyanate resin and silicone resin, or a mixture of two or more of them. Preferably, nylon resin or polyethylene terephthalate (PET) may be used.

In addition, the second polymer resin layer 130 may have a thickness of about 5-50 μm, preferably. The second polymer resin layer 130 functions to protect the outside of the packaging material or to retain the shape of a battery through elastic restoration upon deformation. When the second polymer resin layer has a thickness smaller than 5 μm, it is not possible to retain rigidity. When the second polymer resin layer has a thickness larger than 50 μm, the capacity per volume of a battery may be decreased undesirably.

Meanwhile, according to the present disclosure, the barrier layer 120 including a parylene layer 121 may further include an adhesive layer 140 formed on the surface that is in contact with the first polymer resin layer 110, or the surface that is in contact with the second polymer resin layer 130, so that the adhesion between the first or the second polymer resin layer 110, 130 and the barrier layer 120 may be further improved. Although the adhesive layer 140 is interposed between the barrier layer 120 and the second polymer resin layer 130 in FIG. 6, the adhesive layer may be interposed between the parylene layer 121 and the first polymer resin layer 110. In addition, the adhesive layer 140 may be interposed not only between the parylene layer 121 and the first polymer resin layer 110 but also between the barrier layer 120 and the second polymer resin layer 130.

The adhesive layer may be formed by using a conventional adhesive. For example, the adhesive layer may be formed by applying, for example, casting a polyacrylate-based adhesive.

According to an embodiment of the present disclosure, since the packaging for a flexible secondary battery further includes a parylene layer capable of reinforcing the mechanical rigidity and flexibility of the barrier layer, it is characterized by more reinforced water permeation-preventing property.

Such excellent water permeation-preventing property of the packaging for a flexible secondary battery may be determined by a change in water vapor transmission rate before and after repeating a 5R bending test 100 times. Such a change in water vapor transmission rate of the packaging for a flexible secondary battery before and after repeating a 5R bending test 100 times may be 1-15%, 5-15%, 5.6-14.8%, or 5.6-9.2%. When the change in water vapor transmission rate satisfies the above-defined range, the packaging for a flexible secondary battery has excellent mechanical rigidity and flexibility, and thus little cracking occurs on the packaging surface even after repeating the bending test 100 times. This suggests that the packaging for a flexible secondary battery has an excellent effect of preventing moisture permeation.

Herein, the 5R bending test is a test in which a bar having a circular section with a radius of 5 mm is used, and a packaging for a flexible secondary battery is bent and then unfolded along the circumference of the bar for 1 cycle, and such a cycle is repeated for a predetermine number of cycles.

The change in water vapor transmission rate is calculated by the following formula:

Change in water vapor transmission rate=[(Water vapor transmission rate after bending−Water vapor transmission rate before bending)/(Water vapor transmission rate before bending)]×100

Meanwhile, in another aspect of the present disclosure, there is provided a flexible secondary battery which includes a flexible electrode assembly and a packaging for receiving the flexible electrode assembly, wherein the packaging is the above-described packaging for a flexible secondary battery according to the present disclosure.

According to the present disclosure, the flexible electrode assembly may include a positive electrode, a negative electrode and a separator interposed between both electrodes. Herein, the flexible electrode assembly may have a structure including one positive electrode and one negative electrode wound with a separator interposed therebetween, or a structure in which a plurality of positive electrodes and a plurality of negative electrode stacked with separators interposed therebetween. In addition, the flexible electrode assembly may be a flexible electrode assembly including an internal electrode, a separator and an external electrode.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

EXAMPLE 1

A cast polypropylene (CPP) film having a thickness of 20 μm was prepared as the first polymer resin layer, and a polyacrylate-based adhesive was applied onto the cast polypropylene (CPP) film to a thickness of 2 μm through a casting process to form an adhesive layer. Then, aluminum (Al) foil having a thickness of 15 μm was attached thereto as a barrier layer. After that, a parylene layer (parylene-C) was formed on the aluminum foil to a thickness of 2 μm by using a deposition chamber. Herein, the parylene layer was formed by loading p-xylene dimers to the vaporizer of the deposition chamber, vaporizing the dimers at 150° C. under 1 torr to produce gaseous parylene dimers, pyrolizing the gaseous dimers at 680° C. under 0.5 torr to produce parylene monomers, and carrying out vapor deposition at 25° C. under 0.1 torr for 20 minutes. Then, a polyacrylate-based adhesive was applied on the parylene layer to a thickness of 2 μm through a casting process to form an adhesive layer, and a nylon film having a thickness of 25 μm was attached thereto as the second polymer resin layer to obtain a packaging for a flexible secondary battery.

EXAMPLE 2

A packaging for a flexible secondary battery was obtained in the same manner as Example 1, except that the parylene layer was formed to a thickness of 0.1 μm by carrying out vapor deposition for 1 minute.

EXAMPLE 3

A packaging for a flexible secondary battery was obtained in the same manner as Example 1, except that the parylene layer was formed to a thickness of 2.5 μm by carrying out vapor deposition for 25 minutes.

COMPARATIVE EXAMPLE 1

A packaging for a flexible secondary battery was obtained in the same manner as Example 1, except that no parylene layer was formed.

COMPARATIVE EXAMPLE 2

A packaging for a flexible secondary battery was obtained in the same manner as Example 1, except that the parylene layer was formed to a thickness of 0.05 μm by carrying out vapor deposition for 30 seconds.

COMPARATIVE EXAMPLE 3

A packaging for a flexible secondary battery was obtained in the same manner as Example 1, except that the parylene layer was formed to a thickness of 5 μm by carrying out vapor deposition for 50 minutes.

Evaluation of Physical Properties
Evaluation of Water Vapor Transmission Rate (WVTR) Before and After Bending
(1) Evaluation of Water Vapor Transmission Rate Before Bending Each packaging for a flexible secondary battery according to Examples 1-3 and Comparative Examples 1-3 was cut into a size of 108 mm×108 mm, and mounted to the inside of a water vapor transmission rate tester (model name: SJTM-014, available from SEJIN TECHNOLOGY). Then, dry nitrogen gas containing no water vapor was introduced to one surface of the packaging for a flexible secondary battery, and water vapor was introduced to the other surface thereof. Herein, the two spaces to which each of the gases was introduced were isolated from each other so that the gases introduced to both sides of the packaging for a flexible secondary battery might not be mixed with each other. Meanwhile, during the test, the temperature was set to 38° C. and humidity was set to 100% RH and the conditions were maintained. Then, a humidity sensor was used to measure the amount of water vapor at the surface to which dry nitrogen gas was introduced, for 24 hours. The amount of water vapor was divided by the area of the surface to derive the amount of water vapor transmitted through the pouch film for 24 hours per unit area, which was evaluated as a water vapor transmission rate (WVRT). The results are shown in the following Table 1.

(2) Evaluation of Water Vapor Transmission Rate After Bending

Each packaging for a flexible secondary battery according to Examples 1-3 and Comparative Examples 1-3 was tested by a 5R bending test repeatedly 100 times, and the water vapor transmission rate was evaluated under the above-described conditions. The results are shown in the following Table 1. Herein, the 5R bending test is a test in which a bar having a circular section with a radius of 5 mm is used, and a packaging for a flexible secondary battery is bent and then unfolded along the circumference of the bar for 1 cycle, and such a cycle is repeated for a predetermine number of cycles.

(3) Change in Water Vapor Transmission Rate

A change in water vapor transmission rate was calculated according to the following formula. The results are shown in the following Table 1.

Change in water vapor transmission rate=[(Water vapor transmission rate after bending−Water vapor transmission rate before bending)/(Water vapor transmission rate before bending)]×100

TABLE 1

|  | Ex. 1 | Ex. 2 | Ex. 3 | Comp. Ex. 1 | Comp. Ex. 2 | Comp. Ex. 3 |
|---|---|---|---|---|---|---|
| WVTR before bending (g/m² · day) | 0.00392 | 0.00384 | 0.00372 | 0.00383 | 0.00386 | 0.00394 |
| WVTR after bending (g/m² · day) | 0.00428 | 0.00441 | 0.00393 | 0.00628 | 0.00621 | 0.00647 |
| Change in WVTR (%) | 9.2 | 14.8 | 5.6 | 64.0 | 60.9 | 64.2 |

Referring to Table 1, each packaging for a flexible secondary battery according to Examples 1-3 shows a significantly low change in water vapor transmission rate (WVTR) of about 15% or less before and after bending, after carrying out the bending test 100 times. On the contrary, each packaging for a flexible secondary battery according to Comparative Examples 1-3 shows a significantly high change in WVTR of 60% or more before and after bending. In other words, each packaging for a flexible secondary battery according to Examples 1-3 includes a parylene layer having an optimized thickness to reinforce the mechanical rigidity and flexibility of the barrier layer, and thus little cracking occurs on the packaging surface after carrying out the bending test 100 times, thereby providing a reinforced effect of preventing moisture permeation. However, as Comparative Examples 1-3 have no parylene layer or have a parylene layer out of the optimized thickness range, thus significant cracking occurs on the packaging surface after the bending test, resulting in a significant increase in WVTR.

(4) Observation of Appearance After Bending

Each packaging for a flexible secondary battery according to Example 1 and Comparative Examples 1-3 was used to provide a flexible secondary battery. The appearance of each flexible secondary battery was observed after carrying out the 5R bending test 10 times. The results are shown in FIGS. 7-10.

Herein, the flexible secondary battery was obtained as follows.

First, slurry containing graphite/Denka black/polyvinylidene difluoride (PVdF) (=70/5/25 wt %) was prepared and coated on a Cu wire having a thickness of 250 μm to provide a wire-type electrode having a graphite electrode layer. Four wire electrodes obtained as described above were wound to form an open structured internal electrode portion having a spring-like shape with an internal vacancy in which a lithium ion supplying core portion might be present. Next, a separator was wound around the internal electrode portion to form a separator layer. Then, $LiCoO_2$/Denka black/PVdF (=85/5/15 wt %) was formed on Al foil, conductive layer slurry (Denka black/PVdF=40/60 wt %) was coated onto the electrode layer, and then a non-woven web as a porous polymer substrate was disposed on the conductive layer slurry and dried to obtain a sheet-like external electrode. The resultant sheet-like external electrode was cut into a width of 2 mm and was wound around the internal electrode/separator layer to obtain an electrode assembly.

After the external surface of the electrode assembly was surrounded with each packaging for a flexible secondary battery according to Example 1 and Comparative Examples 1-3, heating and pressurization were carried out at 150° C. under 50 kgf for 3 seconds so that the first polymer resin layer was bound to the electrode assembly (herein, the inlet for injecting an electrolyte was maintained in a non-sealed state). Then, a non-aqueous electrolyte (1M $LiPF_6$, EC/PC/DEC) was injected to the central portion of the open structured internal electrode support by using a syringe through the non-sealed portion to form a lithium ion supplying core portion, and then the non-sealed portion was sealed completely. Then, heating was carried out at 130° C. for 1 minute so that the second polymer resin layer functioning as a heat shrinking tube might be shrunk and sealed tightly, thereby providing a flexible secondary battery.

Figure 7:
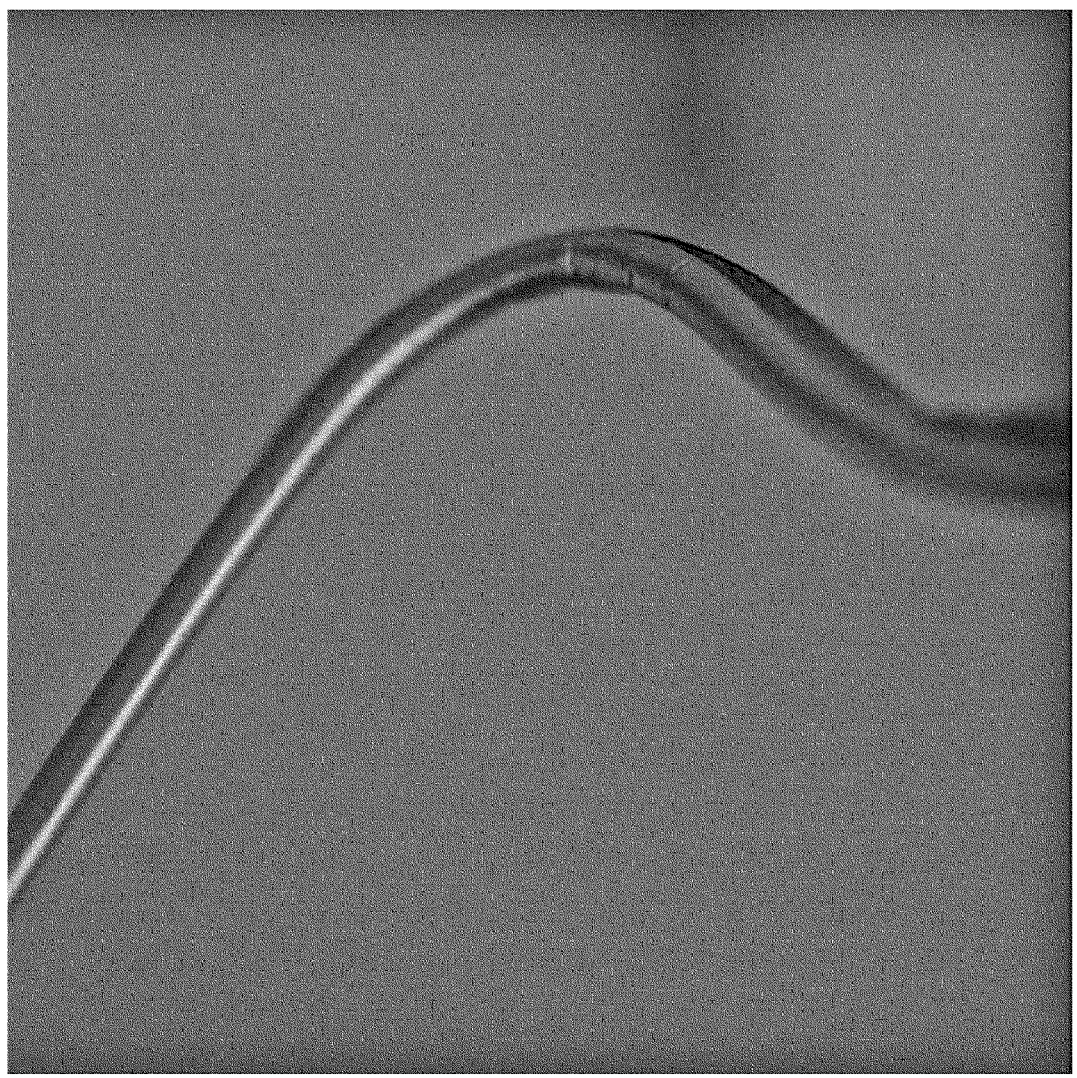
FIG. 7 is a photographic view illustrating the appearance of the packaging for a flexible battery according to Example 1, after a bending test.
Figure 8:
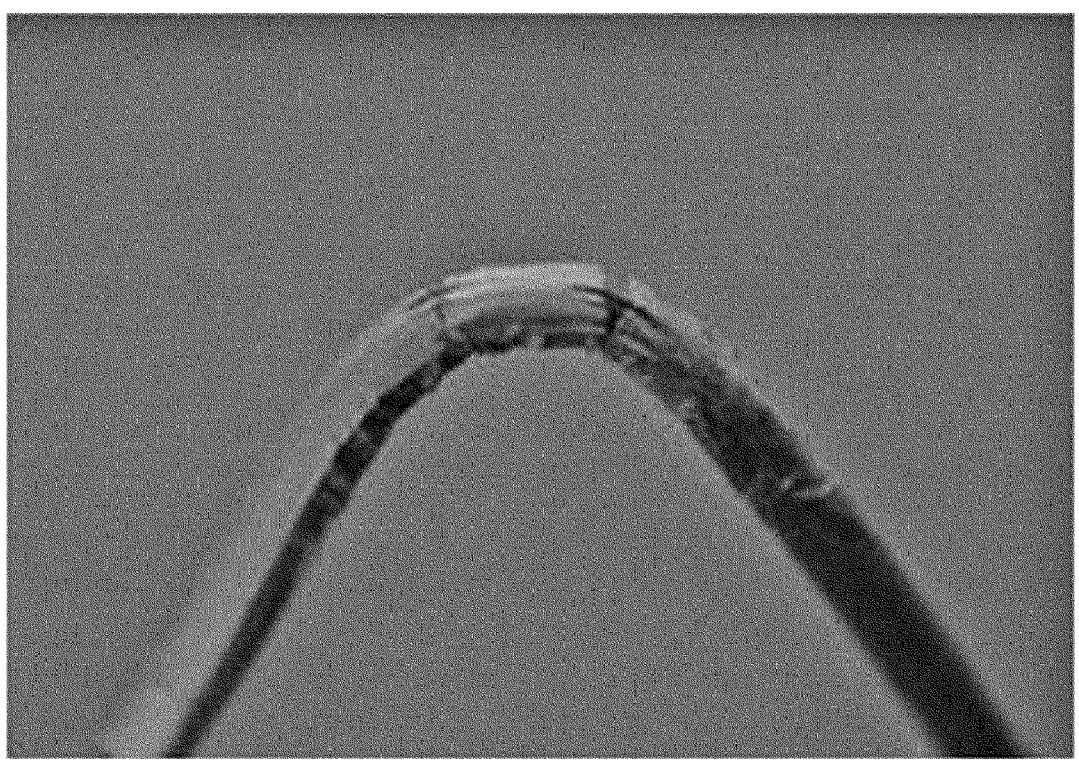
FIG. 8 is a photographic view illustrating the appearance of the packaging for a flexible battery according to Comparative Example 1, after a bending test.
Figure 9:
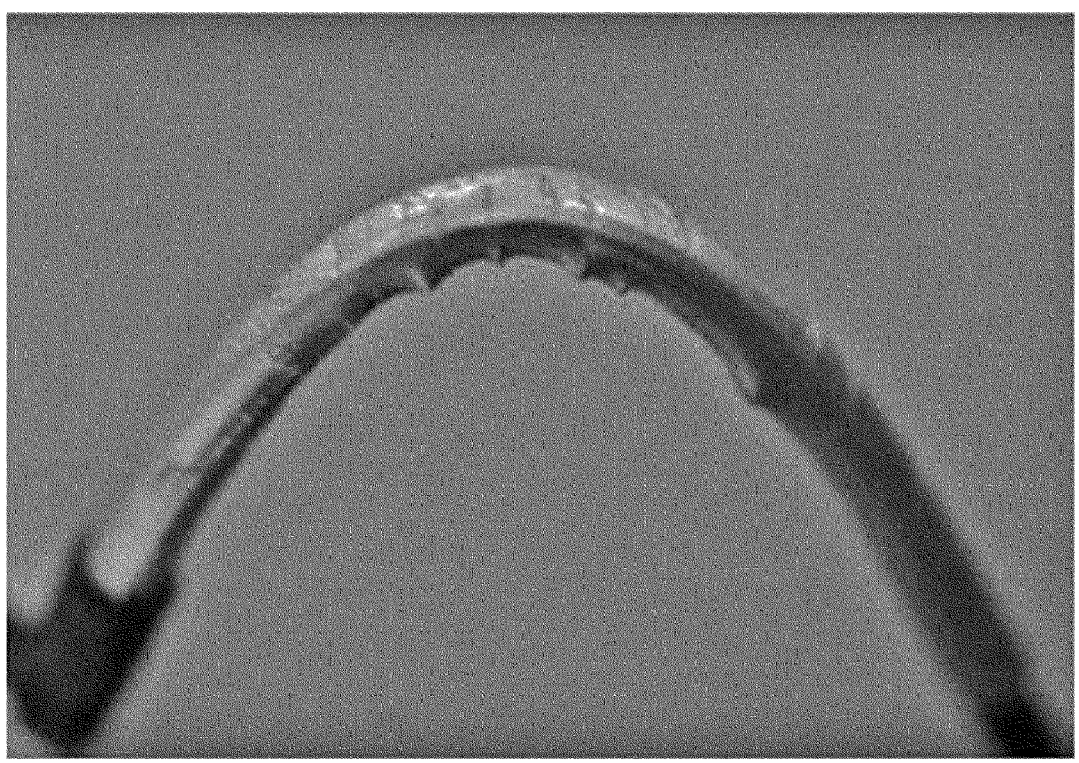
FIG. 9 is a photographic view illustrating the appearance of the packaging for a flexible battery according to Comparative Example 2, after a bending test.
Figure 10:
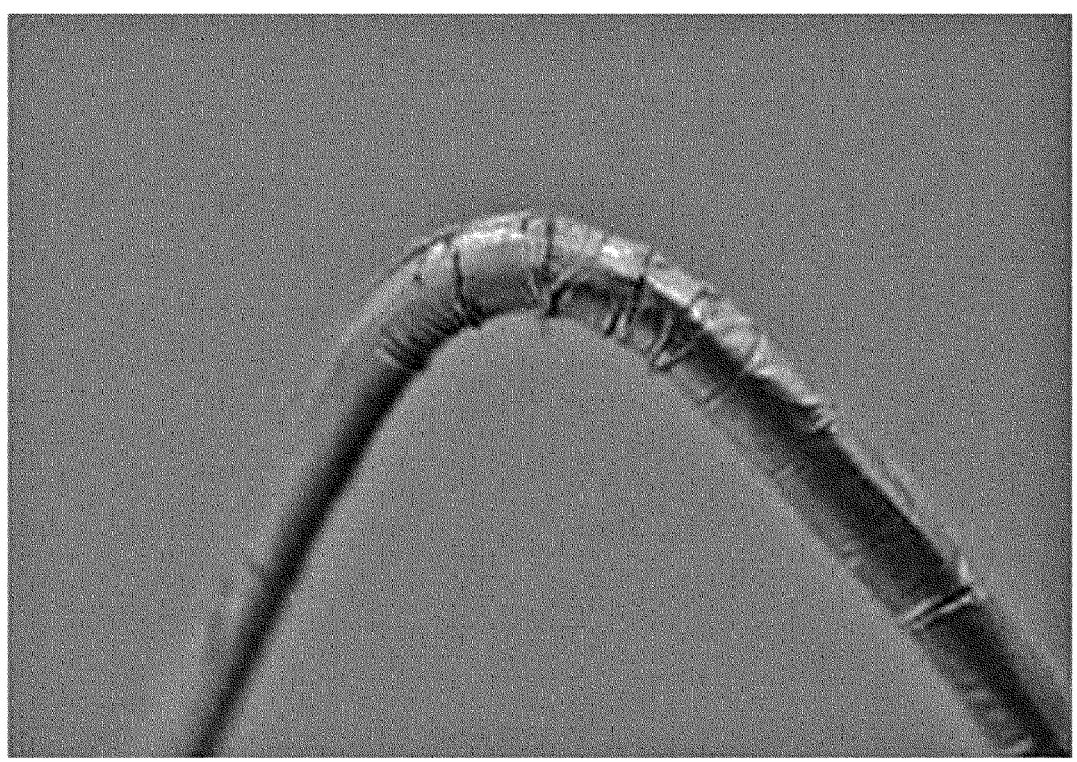
FIG. 10 is a photographic view illustrating the appearance of the packaging for a flexible battery according to Comparative Example 3, after a bending test.

Referring to FIG. 7, the flexible secondary battery obtained by using the packaging for a flexible secondary battery according to Example 1 causes no cracking on the surface even after carrying out the 5R bending test 10 times. Thus, it can be seen that the packaging shows excellent flexibility. On the contrary, referring to FIGS. 8-10, the flexible secondary battery obtained by using each packaging for a flexible secondary battery according to Comparative Examples 1-3 shows poor flexibility, and thus causes significant cracking on the surface after carrying out the 5R bending test 10 times.

It should be understood that the detailed description are given by way of illustration only and various changes and modifications may be made without departing from the scope of the invention as defined in the following claims. Therefore, the embodiments disclosed herein are not intended to limit the scope of the present disclosure but are for illustrative purposes only, and the scope of the present disclosure is not limited thereto. It should be also understood that the scope of the present disclosure is defined by the following claims and all equivalents thereof are also included in the scope of the present disclosure.

DESCRIPTION OF DRAWING NUMERALS 10, 100: Packaging
11, 110: First polymer resin layer
12, 120: Barrier layer
121: Parylene layer
13, 130: Second polymer resin layer
14, 140: Adhesive layer

What is claimed is:

1. A packaging for a flexible secondary battery, comprising:
   a first polymer resin layer;
   a barrier layer formed on the first polymer resin layer for interrupting moisture and gases;
   a parylene layer including parylene on at least one surface of the barrier layer; and
   a second polymer resin layer formed on the barrier layer, wherein
   the parylene layer has a thickness of 0.1-2.5 μm.

2. The packaging for a flexible secondary battery according to claim 1, wherein the parylene is parylene-C.

3. The packaging for a flexible secondary battery according to claim 1, wherein the first polymer resin layer includes any one selected from the group consisting of polyolefin resin, polyester resin, polyamide resin, polyethyleneimine resin, polyether resin, cyanoacrylate resin, organotitanium-based resin, polyurethane resin, polyetherurethane resin, epoxy resin, imide resin, isocyanate resin and silicone resin, or a mixture of two or more thereof.

4. The packaging for a flexible secondary battery according to claim 1, wherein the second polymer resin layer includes any one selected from the group consisting of polyolefin resin, polyester resin, polyamide resin, polyethyleneimine resin, polyether resin, cyanoacrylate resin, organotitanium-based resin, polyurethane resin, polyetherurethane resin, epoxy resin, imide resin, isocyanate resin and silicone resin, or a mixture of two or more thereof.

5. The packaging for a flexible secondary battery according to claim 1, wherein the thickness of the parylene layer is 2-2.5 μm.

6. The packaging for a flexible secondary battery according to claim 1, further comprising an adhesive layer formed on at least one of a surface on which the barrier layer is in contact with the first polymer resin layer, and a surface on which the barrier layer is in contact with the second polymer resin layer.

7. The packaging for a flexible secondary battery according to claim 1, which shows a change in water vapor transmission rate of 1-15% before and after repeating a 5R bending test 100 times, and the change in water vapor transmission rate is calculated by the formula of 'Change in water vapor transmission rate (%)=[(Water vapor transmission rate after bending−Water vapor transmission rate before bending)/(Water vapor transmission rate before bending)]×100'.

8. A flexible secondary battery comprising a flexible electrode assembly and the packaging of claim 1 for receiving the flexible electrode assembly.

9. The packaging for a flexible secondary battery according to claim 1, wherein the barrier layer includes a metal foil layer, an inorganic layer or a composite of polymer with metal particles.

10. The packaging for a flexible secondary battery according to claim 9, wherein the barrier layer includes a metal foil layer, and the metal foil layer includes any one selected from the group consisting of iron, carbon, chromium, manganese, nickel, copper, silver, gold and aluminum, or an alloy of two or more thereof.

11. The packaging for a flexible secondary battery according to claim 9, wherein the barrier layer further includes an inorganic layer having inorganic particles including at least one of $SiO_2$, $Al_2O_3$, MgO, $BaTiO_3$, $ZrO_2$ or ZnO.

12. The packaging for a flexible secondary battery according to claim 9, wherein the barrier layer further includes a composite of polymer with metal particles, and the polymer is formed of any one selected from the group consisting of high-density polyethylene, low-density polyethylene, linear low-density polyethylene, ultrahigh-molecular weight polyethylene, polypropylene, polyethylene terephthalate, polybutylene terephthalate, polyester, polyacetal, polyamide, polycarbonate, polyimide, polyetherether ketone, polyether sulfone, polyphenylene oxide, polyphenylene sulfide and polyethylene naphthalate, or a mixture of two or more thereof.

13. The packaging for a flexible secondary battery according to claim 9, wherein the barrier layer further includes a composite of polymer with metal particles, and the metal particles are any one selected from the group consisting of iron, carbon, chromium, manganese, nickel, copper, silver, gold and aluminum, or an alloy of two or more thereof.

* * * * *